United States Patent [19]

Ochiai et al.

[11] 4,335,284

[45] Jun. 15, 1982

[54] SWITCH FOR DIRECTION INDICATOR OF VEHICLE

[75] Inventors: Takeshi Ochiai, Toyota; Jun Ohta, Nagoya; Minoru Izawa, Okazaki; Takashi Haneda, Toyota, all of Japan

[73] Assignee: Toyota Jidosha Kogyo Kabushiki Kaisha, Toyota, Japan

[21] Appl. No.: 114,367

[22] Filed: Jan. 22, 1980

[30] Foreign Application Priority Data

Jan. 24, 1979 [JP] Japan .............................. 54-8076[U]

[51] Int. Cl.³ .............................................. H01H 3/16
[52] U.S. Cl. ................................ 200/61.27; 200/61.3; 200/61.34; 200/61.54; 308/240
[58] Field of Search ............... 200/61.27, 61.28, 61.29, 200/61.3, 61.31, 61.32, 61.33, 61.34, 61.35, 61.36, 61.37, 61.38, 61.54, 301, 288; 340/52 R, 54, 55, 56; 308/240

[56] References Cited

U.S. PATENT DOCUMENTS 3,938,868  2/1976  VanWyk ............................ 308/240
4,123,632 10/1978  Muto ................................ 200/61.27

FOREIGN PATENT DOCUMENTS 2609630  9/1977  Fed. Rep. of Germany ... 200/61.27

Primary Examiner—J. V. Truhe
Assistant Examiner—Morris Ginsburg
Attorney, Agent, or Firm—Stevens, Davis, Miller & Mosher

[57] ABSTRACT

The present invention relates to improvements in a switch for a direction indicator suitable for use in a motor car comprising: a bracket operationally associated with a control lever for a direction indicator and rotatable through a predetermined angle in dependence on a direction indicated; a rachet opposed to the main body of the bracket through a steering wheel, opposite end portions of which are constantly biased in a direction of being engaged with opposite end portions of the main body of the bracket, and rotatable through a predetermined angle in dependence on a direction indicator; and a cancel cam formed at the periphery thereof with projections capable of releasing a condition of engagement between the end portions of the main body of the bracket in response to the rotation of the steering wheel in a state of having a slight clearance in the direction of rotation and rotatable along with the steering wheel. Striking noises occurring during operation of a steering wheel are prevented by: a frictional inclusion interposed between abutting surfaces of the cancel cam and the steering wheel; shock absorbing means provided between abutting surface of the bracket and the ratchet; a lubricant of high viscosity filled in recesses formed on a shock receiving surface of either the bracket or the ratchet; shock absorbing members provided at portions of engagement between the steering wheel and the cancel cam for absorbing clearances in the direction of rotation; and shock absorbing tongues integrally formed either on the end portions of the main body of the ratchet.

11 Claims, 48 Drawing Figures

SWITCH FOR DIRECTION INDICATOR OF VEHICLE

BACKGROUND OF THE INVENTION

1. Field of the Invention

This invention relates to a switch for a direction indicator of a vehicle, and more particularly to improvements of a switch for a direction indicator suitable for use in a motor car, comprising: a bracket operationally associated with a lever for operating the direction indicator and rotated through an predetermined angle in accordance with a direction indicated; a ratchet opposed to the main body of said bracket through a steering wheel shaft, opposite end portions of which are constantly biased in a direction of being engaged with opposite end portions of the main body of said bracket, and rotated by said bracket through a predetermined angle in dependence on the direction indicated; and a cancel cam provided on the periphery thereof with projections capable of releasing the engagement between the main body and the end portion of said bracket in response to the rotation of a steering wheel, biased in a direction of being engaged with the steering wheel in a condition of having a slight clearance in the direction of rotation and rotated along with the steering wheel.

2. Description of the Prior Art

In general, in a vehicle such as a motor car, a direction indicator such as direction indicating lamps are normally used for the purpose of indicating the direction when said vehicle changes its running direction. The switch for the direction indicator is operated prior to the control of a steering wheel when the vehicle and the like turns the running direction, and it is desirable that, after the vehicle changes the running direction by controlling the steering wheel and the like, the switch is automatically returned to its original position when the steering wheel and the like is restored. Consequently, heretofore, such a construction has been adopted that a built-in lever switch for controlling actions of a plurality of contacts through vertical and lateral motions of a lever is provided and said switch is automatically returned to the original position by the utilization of the motion of the steering wheel upon operating the steering wheel.

One example of the conventional switch for a direction indicator of a vehicle of the type as described above is shown in FIGS. 1 and 2. In the drawing, designated as reference numeral 10 is a vehicle body such as a steering column; 12 a steering wheel provided at the forward end of said steering column for controlling the moving direction of the vehicle; 14 a lever for operating the direction indicator projecting sidewise from the steering column; 16 a bracket operationally associated with said lever 14 for operating the direction indicator, adapted to be rotated through a predetermined angle in dependence on the direction indicated and a main body of which is formed into a substantially 'U' letter shape; 18 substantially a letter 'C' shaped ratchet opposed to the main body of said bracket 16 through a steering wheel shaft, opposite end portions of which are constantly biased in a direction of being engaged with opposite ends of the main body of said bracket 16 by a compression spring 20, and rotatable by said bracket 16 through a predetermined angle in dependence on the direction indicated; 22 a cancel cam provided on the periphery thereof with projections 22a capable of releasing the engaged condition between the main body and the end portions of said bracket 16 in response to the rotation of the steering wheel 12, biased by a compression spring 24 in a direction of being engaged with the steering wheel 12 in a condition of having a slight clearance in the direction of rotation, and rotated along with the steering wheel 12; 26 a click motion ball for controlling the motion of said ratchet 18 and said bracket 16 to be stopped with a click motion at a right-turn indicating state R, a non-indication state N or a left-turn indicating state L, respectively; and 10a a stopper formed on the steering column and the like for receiving said click motion ball 26 and positively stopping said bracket 16 and said ratchet 18 in accordance with said respective conditions.

In addition, the cancel cam 22 and the steering wheel 12 are arranged such that cancel pins 22b formed at an abutting surface of the cancel cam 22 are inserted into cancel pin holes 12a formed at an abutting surface of the steering wheel 12, whereby the rotation of the steering wheel 12 is imparted to the cancel cam 22 in a condition of having a slight clearance in the direction of rotation.

Figures 1, 2, 3, 4:
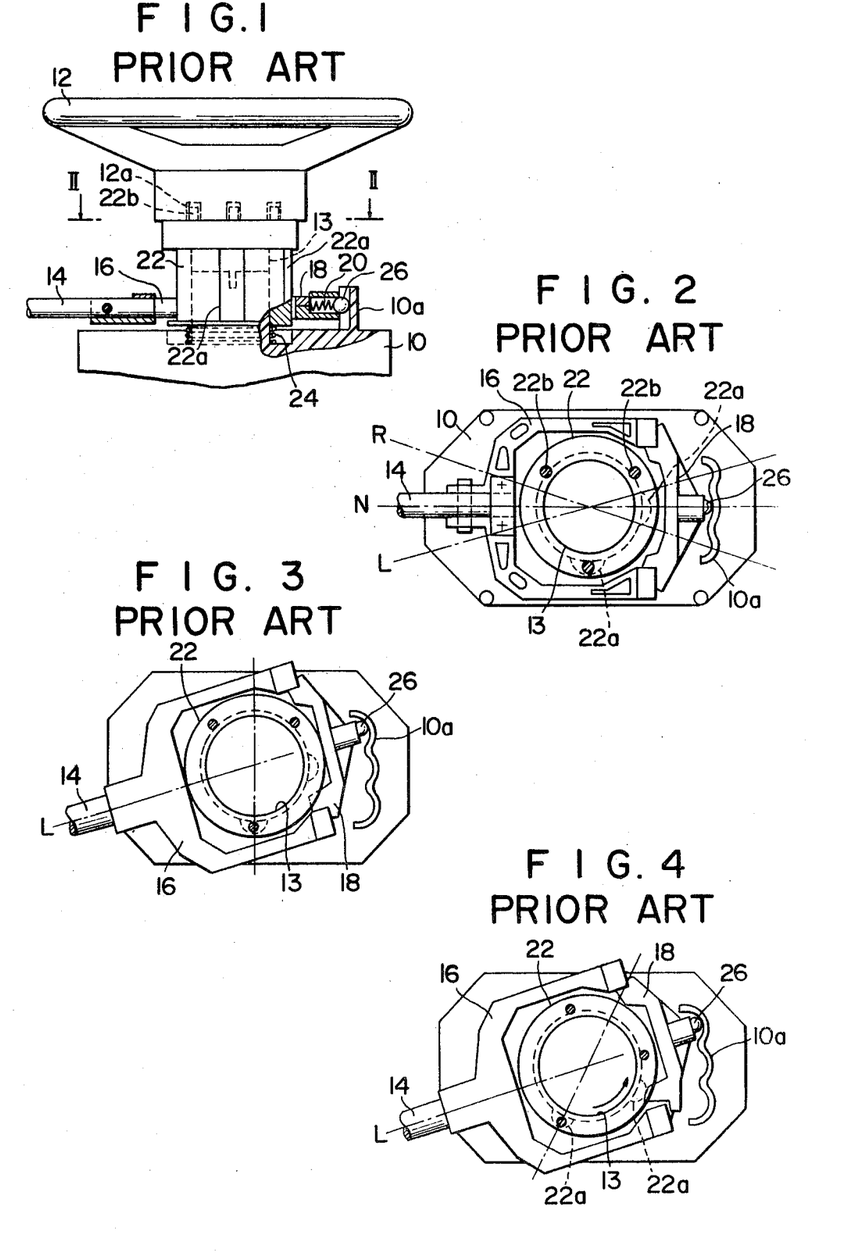
FIG. 1 is a top view showing the vicinity of the steering column of the motor car provided thereon with the conventional switch for the direction indicator of the motor car.
FIG. 2 is a sectional view taken along the line II—II in FIG. 1.
FIGS. 3 and 4 are a sectional view showing the operating condition of the conventional example of the switch for the direction indicator.

In the conventional switch for the direction indicator of the vehicle of the type as described above, the click motion ball 26 of the ratchet 18 is engaged with a central recess of the stopper 10a in the non-indication state N, where the lever for operating the direction indicator is not operated, as shown in FIG. 2. At this state, if the lever 14 for operating the direction indicator is turned in the counterclockwise direction in the drawing to turn the running direction to the left, then the bracket 16 and ratchet 18 is rotated likewise in the counterclockwise direction as shown in FIG. 3, whereby the click motion ball 26 of the ratchet 18 is brought into engagement with an upper recess of the stopper 10a. In this condition of indicating the left turn, if the steering wheel 12 is rotated in the counterclockwise direction to actually change the running direction of the vehicle to the left, then the projections 22a of the cancel cam 22 release the engagement between the lower end of the ratchet 18 and the lower end of the main body of the bracket 16 as shown in FIG. 4. If the steering wheel 12 is rotated further, then the disengagement is discontinued, whereby the lower end portions of the ratchet 18 and the lower end portions of the main body of the bracket 16 are engaged with each other as shown in FIG. 3. If the steering wheel is rotated still further, the engagement between the upper end portions of the ratchet 18 and the upper end portions of the main body of the bracket 16 is released likewise and returned to the original condition. At this time, the click motion ball is in a condition of being received in the upper recess of the stopper 10a, and hence, the operating position of the lever 14 for operating the direction indicator is not changed. If the steering wheel 12 is rotated in the clockwise direction in the drawing to change the running direction of the vehicle to return to the straightly advancing condition, the projection 22a pushes the upper end portion of the ratchet 18 in the clockwise direction. As a result, since the projection 22a releases the engagement between the bracket 16 and the ratchet 18, and since a dividing portion between the upper recess and central recess of the stopper 10a is low enough for the click motion ball 26 to pass, the ratchet 18 is automatically restored to a condition where the click motion ball 26 is engaged with the central recess of the stopper 10a through the agency of the click motion ball 26, i.e., a position where the lever for operating the direction indicator is in the non-indication state.

As described above, the conventional switch for the direction indicator of the vehicle has such a characteristic feature that, in spite of the number of rotations of the steering wheel, the lever for operating the direction indicator is held in the original indicating state, and, when the steering wheel is returned to restore the original running direction, the switch is automatically restored to the non-indication state. However, in the case where the steering wheel is rotated to a direction to which the running direction is to be changed in the state shown in FIG. 4, i.e., the state where the indication of the direction is sent out, when the ratchet 18 passes over the projection 22a of the cancel cam 22, striking noises take place between the ends of the ratchet 18 and bracket 16 thus raising a problem that an unpleasant feeling is given to the driver of the vehicle. Accordingly, hereto, there has been such a practice that a grease of high viscosity is applied onto the abutting surfaces of the ratchet 18 and bracket 16 for the purpose of arresting sounds. However, said grease tends to flow out from the required portion due to heat and mechanical friction during use, with a result that the effect of arresting noises does not last long. Furthermore, the so-called cock grease generally used as the water-proof grease at joint portions of water pipes is adopted as a sound arresting grease. Said cock grease is of high viscosity, with a result that, in use for a mass production line, when the grease is attached to the portions, where application of the grease is not required at all, such as the lever for operating the direction indicator and vehicle body, it is very difficult to remove the grease therefrom, thereby frequently presenting problems in respect of product quality. Further, even in the case where a grease of high viscosity is used, when the grease is used in the switch for the direction indicator, the ambient temperature around which is elevated to as high as 70° to 90° C., it is not avoidable for the grease to be lowered in viscosity, and consequently, there has been presented such a problem that an effective residual presence of the grease at the abutting surfaces cannot be expected for a long period of time.

SUMMARY OF THE INVENTION

The present invention contemplates to obviate the drawbacks of the prior art and has the object to provide a switch for a direction indicator of a vehicle, wherein striking noises occurring between a ratchet and a bracket when the ratchet passes over the projection of the cancel cam can be reliably prevented from occurring for a long period of time.

The abovedescribed object is achieved by providing a frictional inclusion disposed at an abutting surface of a cancel cam in a switch for a direction indicator of a vehicle comprising: a bracket operationally associated with a lever for operating a direction indicator and rotatable through a predetermined angle in dependence on the direction indicated; a ratchet opposed to the main body of said bracket through a steering shaft, opposite end portions of which are constantly biased in the direction of being engaged with opposite end of the main body of said bracket, and rotated by said bracket through a predetermined angle in accordance with the direction indicated; and the cancel cam provided on the periphery thereof with projections capable of releasing the engagement between the main body and end portions of said bracket in response to the rotation of a steering wheel, biased in a direction of being engaged with the steering wheel in a condition of having a slight clearance in the direction of rotation, and rotatable along with the steering wheel.

Or, the abovedescribed object is achieved by providing shock absorbing means disposed at abutting surfaces of said bracket and ratchet in the switch for the direction indicator of the vehicle similar to the one as described above.

Furthermore, there is a case where said shock absorbing means are shock absorbing members provided on shock receiving surfaces of the bracket and ratchet.

Or, there is a case where said shock absorbing means are speed reducing projections formed on sliding surfaces of the bracket and ratchet.

Or, the aforesaid object is achieved by filling a lubricant of high viscosity into a recess formed in at least either one of the shock receiving surfaces of said bracket or ratchet in the switch for the direction indicator of the vehicle similar to the one as described above.

Or, the aforesaid object is achieved by providing shock absorbing members for absorbing clearance in the direction of rotation at a portion of engagement between said steering wheel and cancel cam in a switch for a direction indicator of a vehicle.

Or, the aforesaid object is achieved by integrally forming a shock absorbing tongue on at least one of the end portions of the main body of said bracket and the bracket, which are engaged with each other, in the switch for the direction indicator of the vehicle similar to the one as described above.

Figure 5:
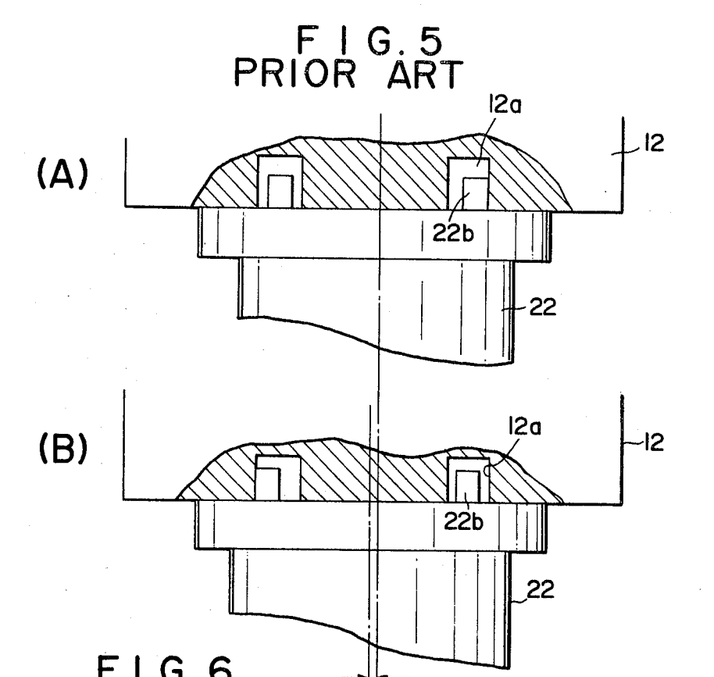
FIGS. 5(A) and 5(B) are sectional views also showing the operating condition of the conventional example.

The present invention is based on that said striking noises occurring between the ratchet and bracket takes place by a collision between the surfaces when the ratchet passes over the cancel cam and drops on the surface of the bracket and the magnitudes of the noises greatly depend upon the speed of revolution, i.e., the dropping speed of the ratchet. That is, the speed of rotation of the cancel cam is, if the cancel cam is completely integrally formed on the steering wheel, equal to the operating speed of the steering wheel. However, in practice, the steering wheel 12 and cancel cam 22 are engaged with each other through the cancel pin holes 12a and cancel pins 22b, between which clearances are formed, whereby the speed of rotation of the cancel cam is higher than the operating speed of the steering wheel. This condition is shown in FIGS. 5(A) and 5(B). FIG. 5(A) shows the relative positional relationship between the cancel pin holes 12a and cancel pins 22b before the projection 22a of the cancel cam 22 comes into contact with the ratchet 18 and after the ratchet 18 has passed over the projection 22a. FIG. 5(B) shows the relative positional relationship between the cancel pin hole 12a and cancel pin 22b at the instant the ratchet 18 passes over the projection 22a of the cancel cam 22. As is apparent from the drawing, there is a gap A between the conditions of FIG. 5(A) and FIG. 5(B), which results from the different clearances between the steering wheel 12 and cancel cam 22. Consequently, at the instant the ratchet 18 passes over the projection 22a, the speed of rotation of the cancel cam 22 is elevated more than the speed of rotation resulting from the operation of the steering wheel through the resiliency of the compression spring 20, and the ratchet 18 abruptly drops onto the abutting surface of the bracket 16. In addition, the gap between the cancel pin 22b and cancel pin hole 12a is inevitable due to the tolerance in dimensions therebetween. The present invention is based on the results of studies made on the causes of the striking noises as described above.

BRIEF DESCRIPTION OF THE DRAWINGS

The abovementioned features and objects of the present invention will become more apparent with reference to the following description taken in conjunction with the accompanying drawings wherein like reference numerals denote like elements and in which.

DETAILED DESCRIPTION OF THE INVENTION

Figure 6:
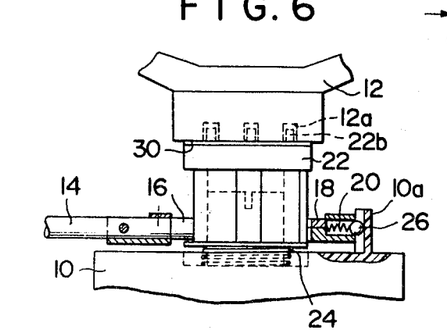
FIG. 6 is a top view showing the vicinity of the steering column of the motor car provided thereon with the first embodiment of the switch for the direction indicator of the vehicle according to the present invention.
Figure 7:
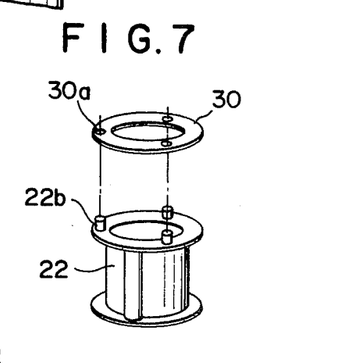
FIG. 7 is a disassembled perspective view showing the state where the frictional ring constituting the frictional inclusion in the aforesaid embodiment is fastened to the cancel cam.
Figure 8:
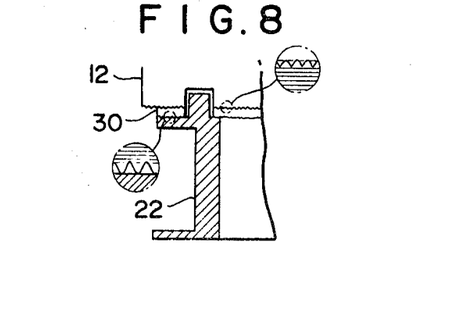
FIG. 8 is a sectional view of the essential portions showing the fastened state.
Figure 9:
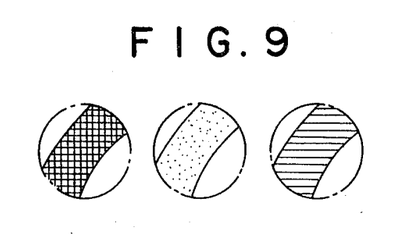
FIG. 9 is a top view showing the properties of surface of the frictional ring in the aforesaid first embodiment.

In the first embodiment of the present invention as shown in FIG. 6, a frictional ring 30 is interposed at the cancel cam's side between the abutting surfaces of the cancel cam 22 and the steering wheel 12. Since the other points are similar to the aforesaid conventional example, explanation thereof is omitted. For example, rubber, cork materials, fabric material or the like which are formed into a ring may be used as said frictional ring 30. Said frictional ring 30 is, as shown in FIG. 7, formed at a position thereof corresponding to the cancel pins 22b of the cancel cam 22 with cancel pin holes 30a whereby said frictional ring 30 may be fastened to the cancel cam 22 by utilizing said cancel pins 22b. Furthermore, to increase a friction effect between the cancel cam 22 and the steering wheel 12, there may be provided irregular surfaces on both faces of the frictional ring 30 which abuts the surfaces of the steering wheel 12 and the cancel cam 22 as shown in FIG. 8. The irregular surfaces include, for example, net-like, spotted, or oblique-lined surfaces as shown in FIG. 9.

According to this embodiment, a frictional ring 30 is merely interposed between the conventional cancel cam 22 and steering wheel 12, whereby the relative speed between the steering wheel 12 and the cancel cam 22 can be made small, whereby enabling to readily prevent the striking noises from occurring without using a sound arresting grease.

Figure 10:
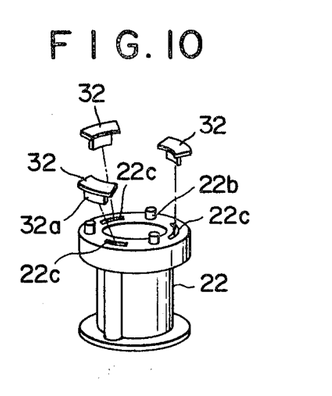
FIG. 10 is a disassembled perspective view showing the state where the frictional piece, which is the frictional inclusion of the switch for the direction indicator of the vehicle in a second embodiment of the present invention, is fastened to the cancel cam.
Figures 11, 12, 13, 14, 15:
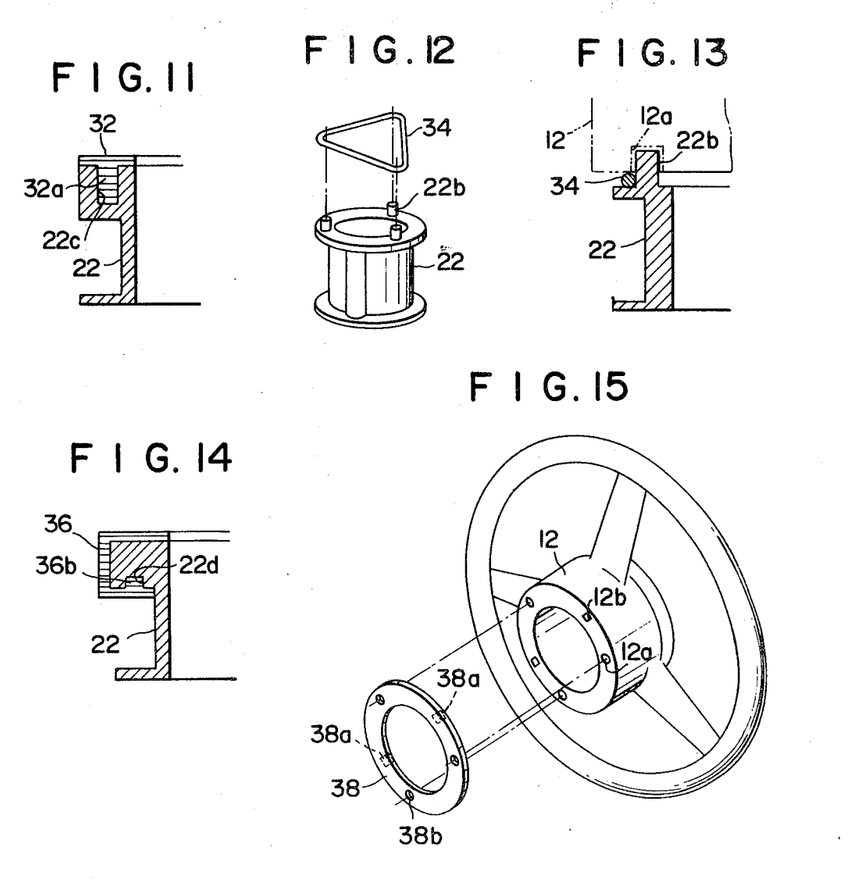
FIG. 11 is a sectional view of the essential portions showing the fastened state.
FIG. 12 is a disassembled perspective view showing the state where the rubber ring, which is the frictional inclusion of the switch for the direction indicator of the vehicle in a third embodiment of the present invention, is fastened to the cancel cam.
FIG. 13 is a sectional view of the essential portions showing the fastened state.
FIG. 14 is a sectional view of the essential portions showing the state where the frictional piece, which is the frictional inclusion of the switch for the direction indicator of the vehicle in a fourth embodiment of the present invention, is fastened to the cancel cam.
FIG. 15 is a disassembled perspective view showing the state where the frictional ring, which is the frictional inclusion of the switch for the direction indicator of the vehicle in a fifth embodiment of the present invention, is fastened to the steering wheel.

The second embodiment of the present invention is shown in FIG. 10. In this embodiment, the frictional inclusion is divided into frictional pieces 32 divided in the circumferential direction and being of substantially a letter 'T' shape in cross-section, and recess 22c engageable with projections 32a of the frictional pieces are provided on the abutting surface of the cancel cam 22 for abutting against the steering wheel 12. A sectional view showing the state where the frictional piece 32 is coupled into the cancel cam 22 is illustrated in FIG. 11. The relative speed between the steering wheel 12 and the cancel cam 22 can be made small also in this embodiment, so that the striking noises are reliably prevented from occurring without using any sound arresting grease.

The third embodiment of the present invention is shown in FIG. 12. In this embodiment, a rubber ring 34 is used as the frictional inclusion, and said rubber ring is spreadingly mounted on the abutting surface of the cancel cam 22 opposed to the steering wheel by utilizing the cancel pin 22b of the cancel cam 22. A sectional view showing the spreadingly mounted state is illustrated in FIG. 13.

According to this embodiment, the relative speed between the steering wheel 12 and the cancel cam 22 can be made small without using any special part, so that the striking noises can be very easily prevented from occurring without using any sound arresting grease.

The fourth embodiment of the present invention is shown in FIG. 14. In this embodiment, the frictional inclusion is formed into a frictional ring 36 covering the end portion of the cancel cam and being of substantially a letter 'U' shape in cross-section, and said frictional ring is inserted into and fixed in a recess 22d formed in the undersurface of the cancel cam 22 by utilizing a ridge 36b formed at the inner surface of said letter 'U' shape portion of said frictional ring 36. In this embodiment too, the relative speed between the steering wheel 12 and the cancel cam 22 can be made small, so that the striking noises can be reliably prevented from occurring without using any sound arresting grease.

Figure 16:
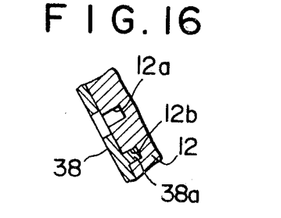
FIG. 16 is a sectional view of the essential portions showing the fastened state.

The fifth embodiment of the present invention is shown in FIG. 15. In this embodiment, a frictional ring 38 formed at its abutting surface opposed to the steering wheel 12 with projections 38a is used as the frictional inclusion, and said frictional ring is solidly secured to the steering wheel 12 by use of holes 12b for fixing formed in the abutting surface of the steering wheel 12 as shown in FIG. 16. In the drawing, designated at 38b are holes for the cancel pins to pass therethrough. In this embodiment too, the relative speed between the steering wheel 12 and the cancel cam 22 can be made small, so that the striking noises can be reliably prevented from occurring without using any sound arresting grease.

Figure 17:
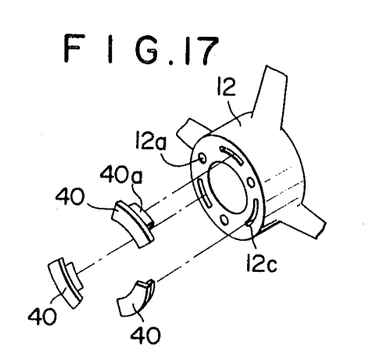
FIG. 17 is a disassembled perspective view showing the state where the frictional piece, which is the frictional inclusion of the switch for the direction indicator of the vehicle in a sixth embodiment of the present invention, is fastened to the steering wheel.
Figure 18:
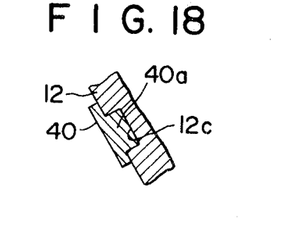
FIG. 18 is a sectional view of the essential portions showing the fastened state.

The sixth embodiment of the present invention is shown in FIG. 17. In this embodiment, frictional pieces 40 divided in the circumferential direction and being of substantially a letter 'T' shape in cross-section are used as the frictional inclusion, and the frictional pieces 40 are fixed in grooves 12c formed in the steering wheel 12 by utilizing its ridges 40a as shown in FIG. 18.

In this embodiment too, the relative speed between the steering wheel 12 and the cancel cam 22 can be made small, so that the striking noises can be reliably prevented from occurring without using any sound arresting grease.

Figure 19:
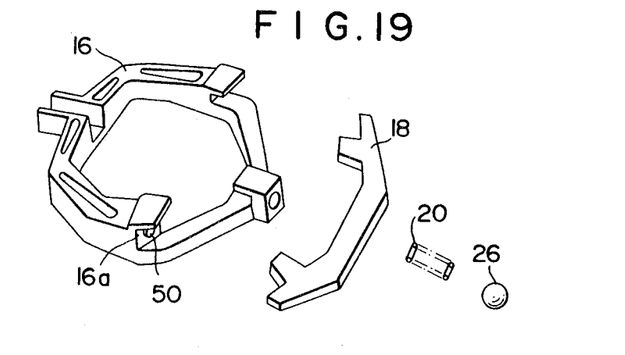
FIG. 19 is a disassembled perspective view showing the bracket and ratchet, for which shock absorbing members are provided, of the switch for the direction indicator of the vehicle in a seventh embodiment of the present invention.
Figure 20:
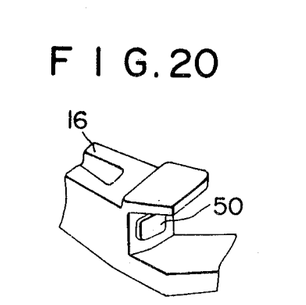
FIG. 20 is a perspective view showing the end portion of the main body of bracket, for which the shock absorbing members are provided, in the seventh embodiment.
Figure 21:
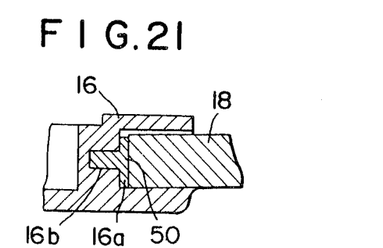
FIG. 21 is a sectional view thereof.

The seventh embodiment of the present invention is shown in FIGS. 19 through 21. In this embodiment, recesses 16b are formed in the shock receiving surfaces 16a at the end portions of the main body of the bracket 16 opposed to the ratchet 18, and shock absorbing members 50 each formed of a rubber, sponge material or the like being of substantially a letter 'T' shape in cross-section are inserted into and fixed in said recesses. Since the other points are similar to the aforesaid conventional example, explanation thereof is omitted.

In this embodiment, even if the end portions of the ratchet 18 collide with the end portions of the main body of the bracket 16 when the ratchet 18 passes over the cancal cam 22, the shock can be absorbed, so that no striking noises occur.

Figure 22:
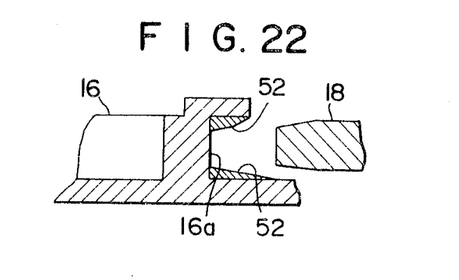
FIG. 22 is a sectional view showing the portion of engagement between the bracket and ratchet of the switch for the direction indicator of the vehicle in an eighth embodiment of the present invention.

The eighth embodiment, which is a version of said seventh embodiment, is shown in FIG. 22. In this embodiment, no recesses are formed in the shock receiving surfaces 16a of the bracket 16, and tapered shock absorbing members 52 are solidly secured to opposite sides of the shock receiving surfaces and side surfaces of the end portions of the ratchet 18 are slightly cut away. Since the other points and functions are similar to said seventh embodiment, explanation thereof is omitted.

Figure 23:
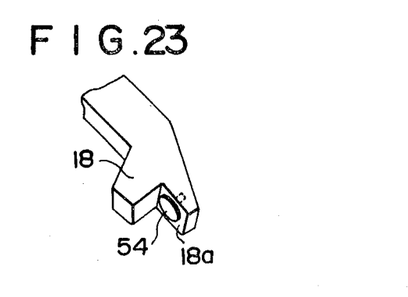
FIG. 23 is a perspective view showing the end portion of ratchet of the switch for the direction indicator of the vehicle in a ninth embodiment of the present invention.
Figure 24:
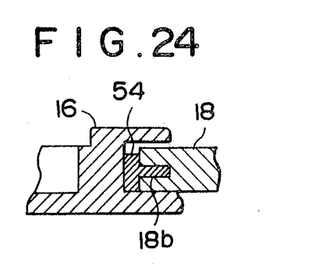
FIG. 24 is a sectional view showing the state of engagement between the bracket and ratchet.

The ninth embodiment of the present invention is shown in FIGS. 23 and 24. In this embodiment, recesses 18b are formed in the shock receiving surfaces of the ratchet 18 opposed to the bracket, and shock absorbing members 54 being of substantially a letter 'T' shape in cross-section are inserted into and fixed in said recesses 18b. Since other arrangements are similar to the aforesaid conventional example and functions are similar to said seventh embodiment, explanations thereof are omitted.

Figure 25:
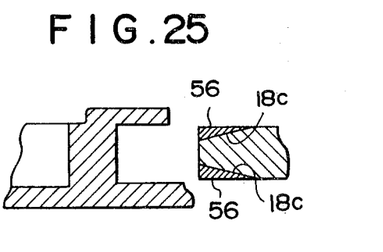
FIG. 25 is a sectional view showing the state of engagement between the bracket and ratchet of the switch for the direction indicator of the vehicle in a tenth embodiment of the present invention.

The tenth embodiment, which is a version of said ninth embodiment, is shown in FIG. 25. In this embodiment, recesses 18c are formed at side surfaces of shock receiving portions at the end portions of the ratchet 18, and shock absorbing materials 56 being tapered in cross-section are solidly secured to said recesses 18c. Since the other arrangements are similar to the aforesaid conventional example and functions are similar to said seventh embodiment, explanations thereof are omitted.

Figure 26:
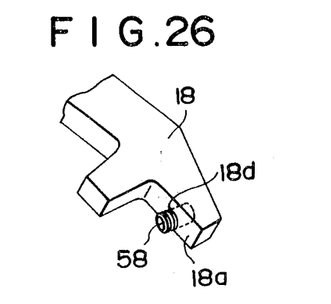
FIG. 26 is a perspective view showing the end portion of ratchet of the switch for the direction indicator of the vehicle in an eleventh embodiment.

The eleventh embodiment of the present invention is shown in FIG. 26. In this embodiment, compression springs 58 weaker in resiliency than the compression spring 20 for supporting the click motion ball 26 are provided in recesses 18d formed on the shock receiving surfaces 18a of the ratchet 18 as the shock absorbing members. Since the other points are similar to the aforesaid conventional example, explanation thereof is omitted.

Figure 27:
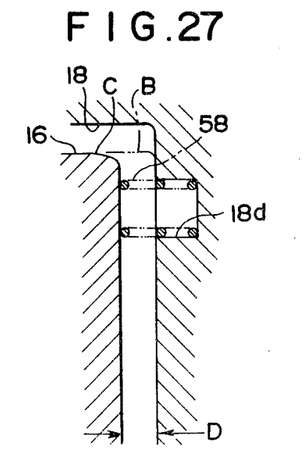
FIG. 27 is a sectional view showing the operating condition in said eleventh embodiment.

With this embodiment, in the normal condition, the compression springs 58 are fully urged into the recesses 18d of the ratchet 18 by the end faces of the main body of the bracket 16 as indicated by broken lines B in FIG. 27. While, a clearance D is formed between the bracket 16 and the ratchet 18 as indicated by solid lines C shown in FIG. 27 when the ratchet 18 passes over the cancel cam 22, whereby the compression springs come into extended conditions. Consequently, said compression springs 58 function to absorb the shocks from the ratchet 18 to the bracket 16 during when said ratchet and bracket are brought together.

Figure 28:
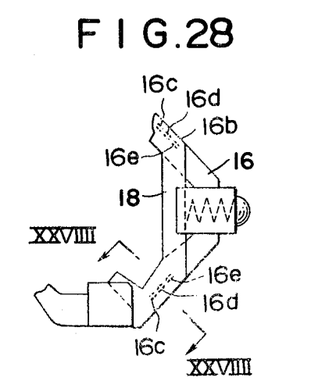
FIG. 28 is a top view showing the bracket of the switch for the direction indicator of the vehicle in a twelfth embodiment of the present invention.
Figure 29:
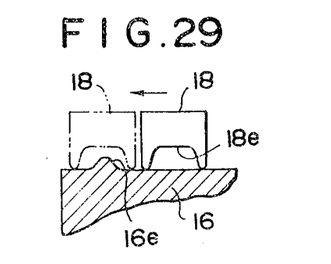
FIG. 29 is a sectional view taken along the line XXVIIII—XXVIIII in FIG. 28 showing the operating condition in said twelfth embodiment.

The twelfth embodiment of the present invention is shown in FIGS. 28 and 29. In this embodiment, projections 16c, 16d and 16e for reducing the speed are formed on surfaces of the bracket 16 sliding on the ratchet 18, and recesses 18e capable of receiving said projections are formed on surfaces of the ratchet 18 sliding on the bracket 16. Since the other points are similar to the aforesaid conventional example, explanation thereof is omitted.

In this embodiment, when the ratchet 18 returns again in a direction of abutting against the bracket 16 after it passed over the projection 22a of the cancel cam 22, the end faces of the ratchet 18 ride on the projections 16c, 16d and 16e for reducing the speed as shown in FIG. 29, whereby the relative speed between the ratchet 18 and the bracket 16 is decreased, so that the shock occurring therebetween can be absorbed.

In this embodiment, it is possible to fill the recesses 18e formed on surfaces of the ratchet 18 sliding on the bracket with the sound arresting grease so as to further improve the shock absorbing effect.

Figure 30:
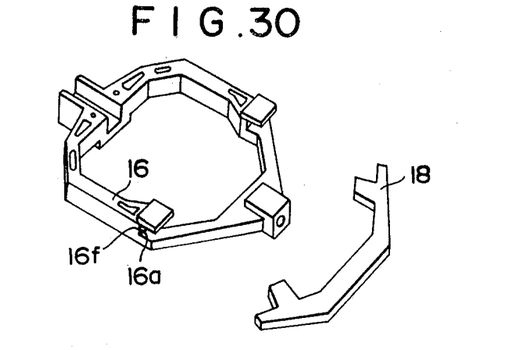
FIG. 30 is a disassembled perspective view showing the bracket and ratchet of the switch for the direction indicator of the vehicle in a thirteenth embodiment of the present invention.
Figure 31:
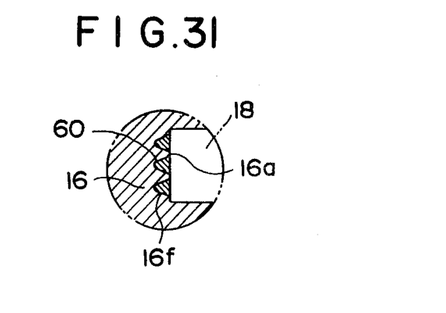
FIG. 31 is a sectional view of the essential portions thereof.

The thirteenth embodiment of the present invention is shown in FIGS. 30 and 31. In this embodiment, a plurality of grooves 16f are formed on the shock receiving surfaces 16a at the end portion of the main body of the bracket 16 opposed to the ratchet 18, and said grooves 16f are filled with a lubricant 60 of high viscosity such as a sound arresting grease or the like. Since the other points are similar to the aforesaid conventional example, explanation thereof is omitted.

In this embodiment, the lubricant 60 such as the sound arresting grease or the like is reliably held in the grooves 16f of the bracket 16 despite mechanical friction due to the relative movement between the bracket 16 and the ratchet 18 or the temperature rising, so that the sound arresting function by the lubricant 60 can be maintained for a long period of time.

Figure 32:
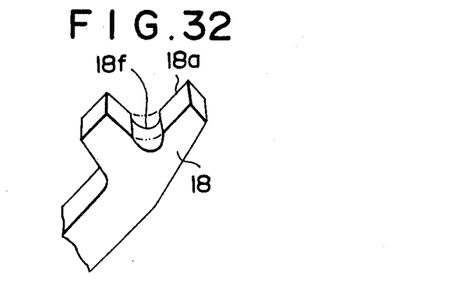
FIG. 32 is a perspective view showing the end portion of the ratchet of the switch for the direction indicator of the vehicle in an fourteenth embodiment of the present invention.
Figure 33:
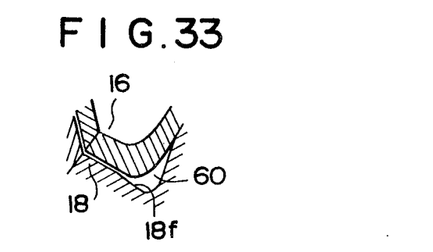
FIG. 33 is a perspective view showing the operating condition thereof.

The fourteenth embodiment of the present invention is shown in FIGS. 32 and 33. In this embodiment, recesses 18f are formed on shock receiving surfaces 18a of the end portions of the ratchet 18 opposed to the end faces of the main body of the bracket 16, and said recesses 18f are filled with the lubricant 60 of high viscosity such as the sound arresting grease. Since the other arrangements are similar to the aforesaid conventional example and functions are similar to the aforesaid thirteenth embodiment, explanations thereof are omitted.

Figure 34:
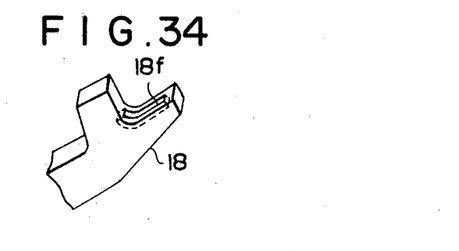
FIG. 34 is a perspective view showing the end portion of the ratchet of the switch for the direction indicator of the vehicle in a fifteenth embodiment of the present invention.
Figure 35:
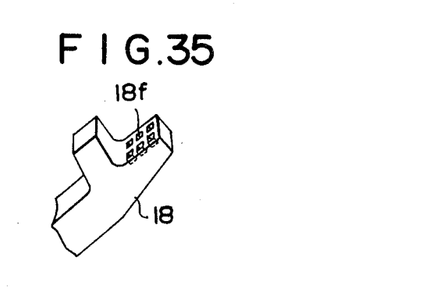
FIG. 35 is a perspective view showing the end portion of the ratchet in a sixteenth embodiment.
Figure 36:
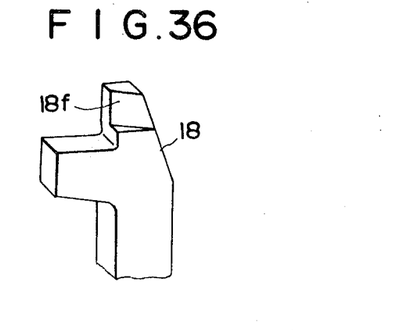
FIG. 36 is a perspective view showing the end portion of the ratchet in a seventeenth embodiment.
Figure 37:
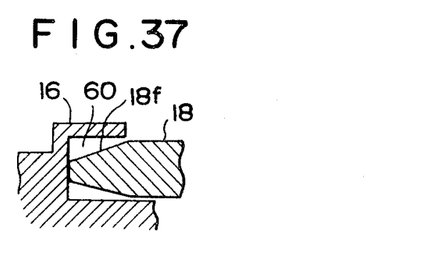
FIG. 37 is a sectional view showing the operating condition in said seventeenth embodiment.

In addition, the recesses 18f in the aforesaid fourteenth embodiment are formed by cutting away portions of the shock receiving surfaces 18a of the ratchet 18, but the method of forming the recesses 18f is not limited to the above, and it is, of course, possible to form said recesses 18f into grooves as in the fifteenth embodiment shown in FIG. 34, to form said recesses into a multiplicity of small recesses as in the sixteenth embodiment shown in FIG. 35, or to form said recesses into tapered cutouts formed on the side surfaces of the shock receiving surfaces as in the seventeenth embodiment shown in FIGS. 36 and 37.

Figure 38:
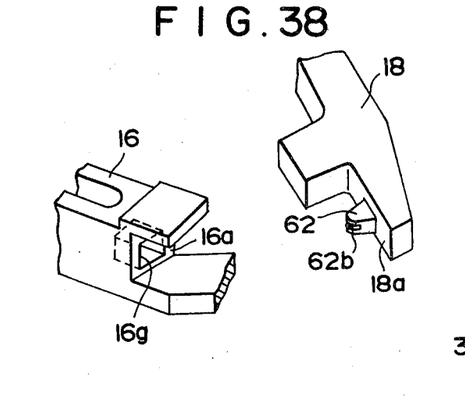
FIG. 38 is a perspective view showing the end portion of the main body of the bracket and the end of the ratchet of the switch for the direction indicator of the vehicle in an eighteenth embodiment of the present invention.
Figure 39:
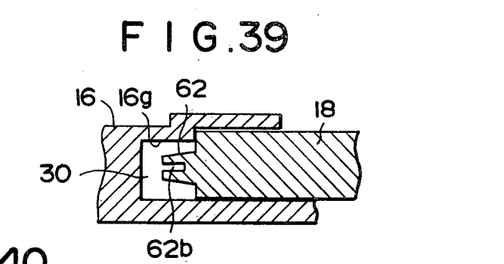
FIG. 39 is a sectional view showing the operating condition in said eighteenth embodiment.

The eighteenth embodiment of the present invention is shown in FIGS. 38 and 39. In this embodiment, recesses 16g are formed on shock receiving surfaces 16a of the bracket 16 opposed to the ratchet 18, and guiding projections each formed at its end face with a recess 62b are formed at shock receiving surfaces 18a of the ratchet 18 opposed to the bracket 16. Since the other points are similar to the aforesaid conventional example, explanation thereof is omitted.

In this embodiment, when the end portions of the main body of the bracket 16 and the end portions of the ratchet 18 are brought into abutting contact with each other, the guiding projections 62 project into the recesses 16g filled with the lubricant 60, whereby the effect to decrease the relative speed therebetween is great, and moreover, such an advantage is offered that the applying area of the lubricant 60 can be increased.

Figure 40:
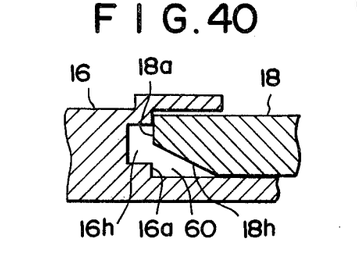
FIG. 40 is a sectional view showing the state of engagement between the bracket and the end portion of the ratchet of the switch for the direction indicator of the vehicle in a nineteenth embodiment of the present invention.

In addition, the method of forming recesses on both the shock receiving surfaces 16a of the bracket 16 opposed to the ratchet 18 and the shock receiving surfaces 18a of the ratchet 18 opposed to the bracket 16 is not limited to the aforesaid eighteenth embodiment, but it is, of course, possible to form recesses 16h on the end faces of the main body of the bracket 16 and also form recesses 18h by cutting away portions of the end portions of the ratchet 18 as in the nineteenth embodiment shown in FIG. 40, whereby spaces formed by said both recesses are filled with the lubricant 60.

Figure 41:
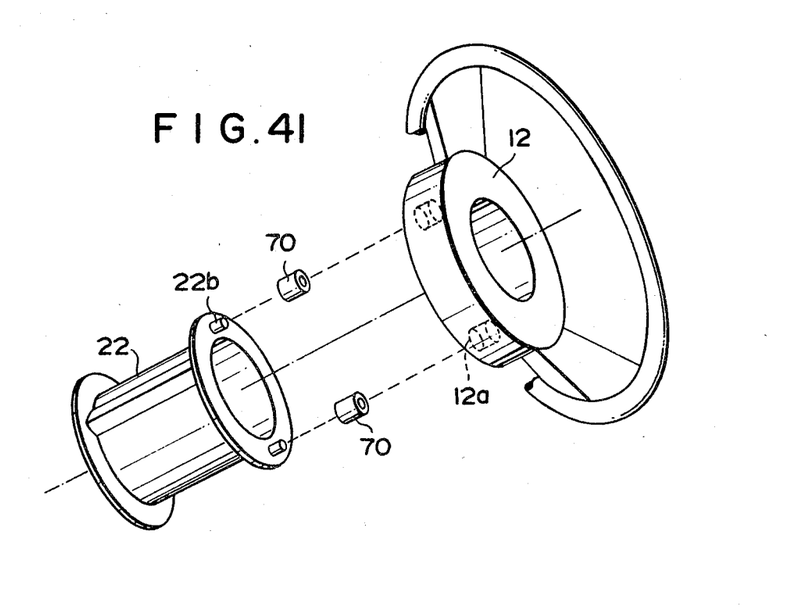
FIG. 41 is a disassembled perspective view showing the assembled state of the steering wheel and cancel cam of the switch for the direction indicator of the vehicle in a twentieth embodiment of the present invention.
Figure 42:
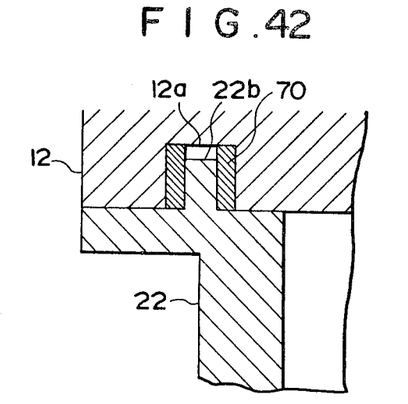
FIG. 42 is an enlarged sectional view of the essential portions thereof.

The twentieth embodiment is shown in FIGS. 41 and 42. In this embodiment, cylindrical shock absorbing members 70 made of rubber, urethane or the like, covering the cancel pins 22b and inserted into the cancel pin holes are provided at portions of engagement between the cancel cam 22 and the steering wheel 12, whereby clearances formed between the cancel pins and the cancel pin holes in the direction of rotation are absorbed.

In this embodiment, the clearances formed between the steering wheel 12 and the cancel cam 22 in the direction of rotation are absorbed by the shock absorbing members 70, whereby the clearances caused by the tolerances produced during manufacture are eliminated, whereby the value of the relative speed therebetween is decreased, and consequently, the cancel cam is not extraordinarily accelerated even when the ratchet passes over the projection of the cancel cam, so that the striking noises between the ratchet and the bracket can be prevented from occurring.

Figure 43:
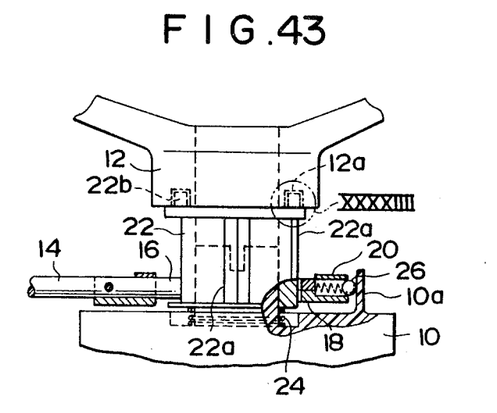
FIG. 43 is a top view showing the assembled state of the switch for the direction indicator of the vehicle in a twenty first embodiment of the present invention.
Figure 44:
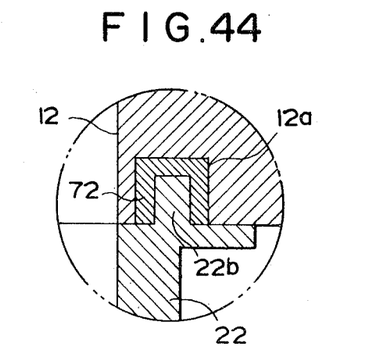
FIG. 44 is an enlarged sectional view showing the portion of XXXXIIII in FIG. 43.

The twenty first embodiment of the present invention is shown in FIGS. 43 and 44. In this embodiment, the clearances formed between the cancel pin holes of the steering wheel 12 and the cancel pins 22b of the cancel cam 22 are filled with a lubricant of high viscosity such as the sound arresting grease or the like. Since the other arrangements are similar to the aforesaid conventional example and functions are similar to the aforesaid twentieth embodiment, explanations thereof are omitted.

In this embodiment, the striking noises can be readily prevented from occurring without using any separate shock absorbing members.

In addition, in the aforesaid twentieth or twenty first embodiment, the cylindrical shock absorbing members or the lubricant is used in the separate form, respectively. However, the combination of both makes it possible to improve the effect in preventing the striking noises from occurring.

Figure 45:
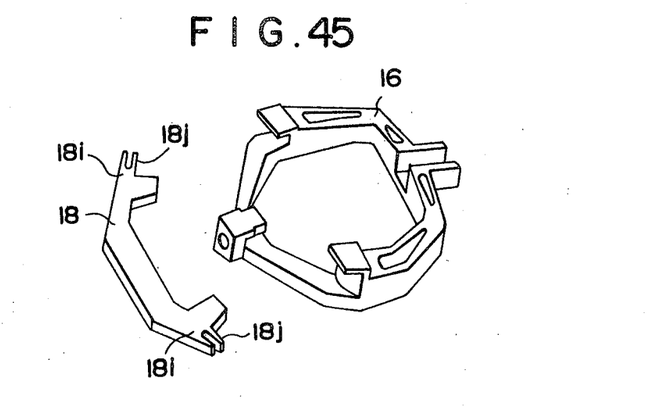
FIG. 45 is a disassembled perspective view showing the assembled state of the bracket and ratchet of the switch for the direction indicator of the vehicle in a twenty second embodiment of the present invention.

The twenty second embodiment is shown in FIG. 45. In this embodiment, shock absorbing tongues 18j being elastic are integrally formed by a resin on the portions 18i of engagement of the ratchet 18 with the bracket 16. Since other points are similar to the aforesaid conventional example, explanation thereof is omitted.

Figure 46:
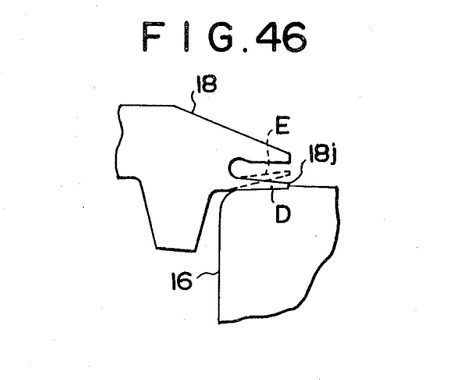
FIG. 46 is a partially enlarged top view showing the operating condition in said embodiments.

In this embodiment, in the normal condition, the end portions of the ratchet 18 and the bracket 16 are in contact with each other as with the shock absorbing tongues 18j are restored as indicated by solid lines D in FIG. 46, whereas, upon dropping of the ratchet 18 onto the bracket 16 after the ratchet 18 has passed over the projection 22a of the cancel cam 22, the shock absorbing tongues 18j are deformed to absorb the shocks occurring between the ratchet 18 and the bracket 16 as indicated by broken lines E in FIG. 46. Consequently, in this case, the striking noises occurring due to the shocks between the ratchet 18 and the bracket 16 can be prevented.

Figure 47:
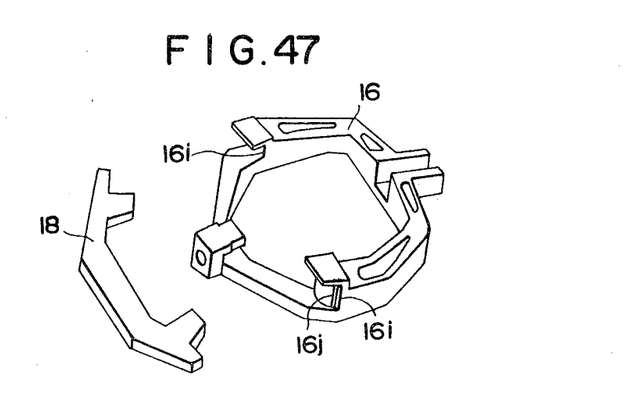
FIG. 47 is a disassembled perspective view showing the assembled state of the bracket and ratchet of the switch for the direction indicator of the vehicle in a twenty third embodiment of the present invention.

The twenty third embodiment of the present invention is shown in FIG. 47. In this embodiment, the shock absorbing tongues 16j are integrally formed by a resin on the main body of the bracket 16 at the end portions of engagement between the bracket 16 and the ratchet 18. Since the other points are similar to the aforesaid conventional example and functions are similar to the aforesaid twenty second embodiment, explanations thereof are omitted.

In addition, in the aforesaid twenty second or twenty third embodiment, the shock absorbing tongues are formed either on the end portions of the main body of the bracket or on the end portions of the bracket. However, it is, of course, possible to further improve the effect in absorbing the shocks by forming said tongues on the both.

In addition, in said respective embodiments, while the invention has been described as being applied to the switch for the direction indicator in the motor car, it is to be understood that the invention is not limited to the above and that it can be applied to any other vehicles requiring the direction indicators in general.

It should be apparent to those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A switch for a direction indicator of a vehicle, comprising:
a. a bracket having a main body operationally connected with a control lever for a direction indicator and rotatable through a predetermined angle in dependence on a direction selected;
b. a ratchet opposed to said main body of said bracket, opposite end portions of which are constantly biased in a direction for engaging with opposite end portions of the main body of said bracket, and rotatable through a predetermined angle in dependence on a direction selected;
c. a cancel cam formed at the periphery thereof with projections capable of releasing engagement between the end portions of the main body of said bracket and said ratchet in response to the rotation of a steering wheel, said cam having means biased in a direction for engaging the steering wheel through a slight clearance with the steering wheel in the direction of rotation and rotating along with the steering wheel; and
d. a frictional sound dampening means interposed between abutting surfaces of said cancel cam and said steering wheel whereby striking noises occurring between the ratchet and bracket are reduced.

2. A switch for a direction indicator of a vehicle as set forth in claim 1, wherein said frictional sound dampening means is a frictional ring fastened to the cancel cam.

3. A switch for a direction indicator of a vehicle as set forth in claim 2, wherein irregular surfaces are formed on said frictional ring opposed to the surfaces of said cancel cam and said steering wheel.

4. A switch for a direction indicator of a vehicle as set forth in claim 1, wherein said frictional sound dampening means is formed into frictional pieces substantially T-shaped in cross-section and engaged with recesses of the cancel cam.

5. A switch for a direction indicator of a vehicle as set forth in claim 1, wherein said cam has cancel pins for engaging said steering wheel and said frictional sound dampening means is a rubber ring spreadingly mounted on cancel pins of the cancel cam.

6. A switch for a direction indicator of a vehicle as set forth in claim 1, wherein said frictional sound dampening means is a frictional ring being substantially U-shaped in cross-section covering an end portion of the cancel cam.

7. A switch for a direction indicator of a vehicle as set forth in claim 1, wherein said frictional sound dampening means is a frictional ring fastened to the steering wheel.

8. A switch for a direction indicator of a vehicle as set forth in claim 1, wherein said frictional sound dampening means is formed into frictional pieces divided in the circumferential direction, being T-shaped in cross-section, and engaged in grooves formed in the steering wheel.

9. A switch for a direction indicator of a vehicle, comprising:
a. a bracket having a main body operationally associated with a control lever for a direction indicator and rotatable through a predetermined angle in dependence on a direction indicated;
b. a ratchet opposed to the main body of said bracket, opposite end portions of which are constantly biased in a direction of being engaged with opposite end portions of the main body of said bracket, and rotatable through a predetermined angle in dependence on a direction indicated;
c. a cancel cam formed at the periphery thereof with projections capable of releasing an engagement between end portions of the main body of said bracket and said ratchet in response to the rotation of a steering wheel, said cam having means biased in a direction for engaging a steering wheel through a slight clearance in the direction of rotation and rotatable along with the steering wheel; and
d. shock absorbing members provided at portions of engagement between said steering wheel and said cancel cam for reducing clearances between said cam and steering wheel in the direction of rotation.

10. A switch for a direction indicator of a vehicle as set forth in claim 9, wherein said shock absorbing members are of cylindrical shape, made of rubber or urethane covering cancel pins and inserted into cancel pin holes of said steering wheel.

11. A switch for a direction indicator of a vehicle as set forth in claim 9, wherein said shock absorbing members comprise a lubricant of high viscosity filled in clearances formed between cancel pin holes of the steering wheel and cancel pins of the cancel cam.

* * * * *